March 6, 1962 R. M. EISENBERG 3,023,517
SIMULATOR
Filed Aug. 20, 1958
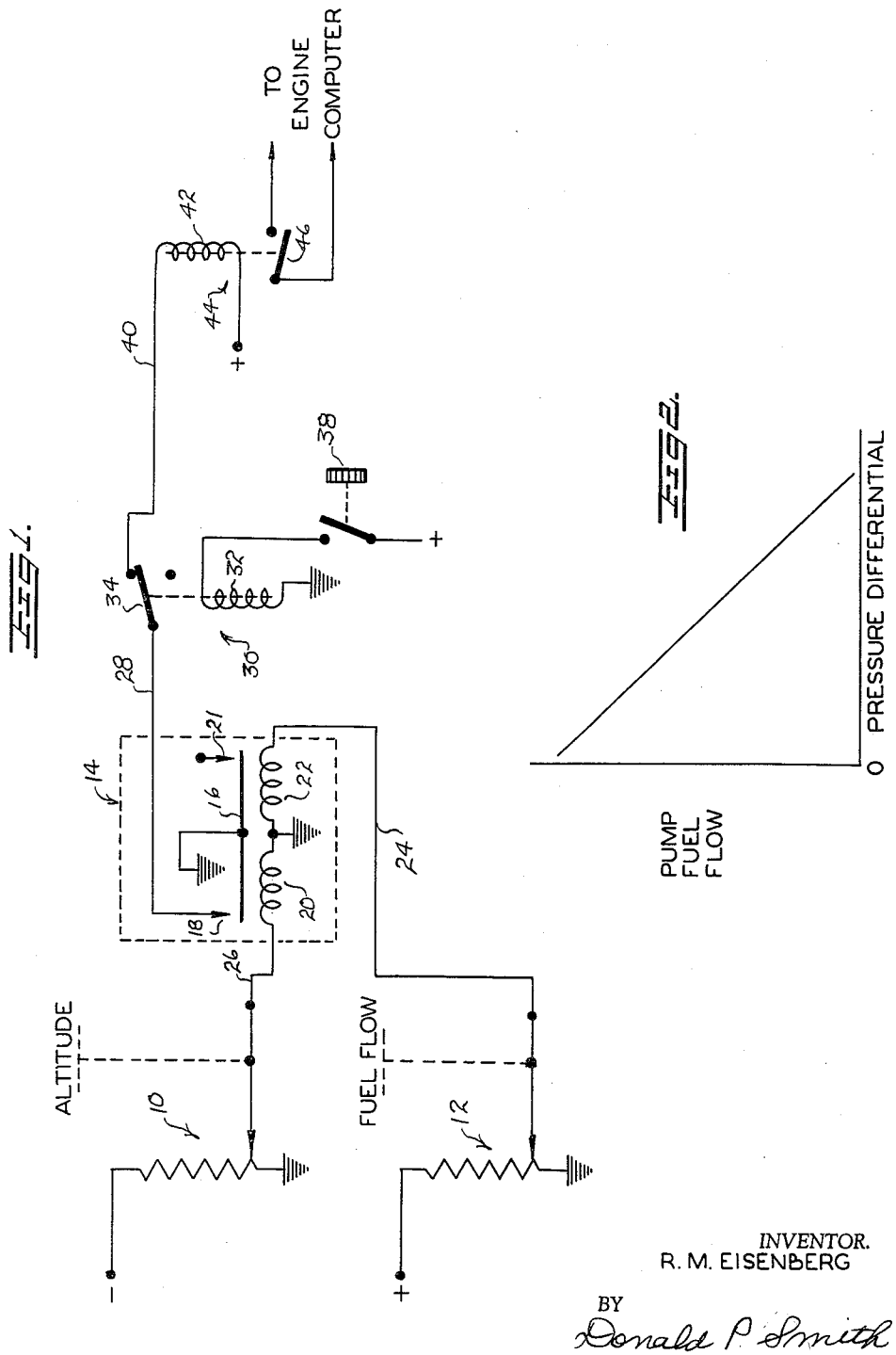
INVENTOR.
R. M. EISENBERG
BY
Donald P. Smith
ATTORNEY

United States Patent Office 3,023,517
Patented Mar. 6, 1962

3,023,517
SIMULATOR
Robert M. Eisenberg, Rockville, Md., assignor to ACF Industries, Incorporated, New York, N.Y., a corporation of New Jersey
Filed Aug. 20, 1958, Ser. No. 756,184
2 Claims. (Cl. 35—12)

This invention relates to a system for simulating aircraft operation, and more particularly, to a circuit in a grounded aircraft trainer for simulating the condition of engine blow out caused by fuel pump cavitation at high altitude.

In an actual jet engine aircraft the fundamental arrangement provides that atmospheric air enters the front of the engine nacelle, which is divided into two compartments fore and aft. The forward compartment is designed to convert the velocity energy of the air into pressure energy with a minimum possible increase in temperature above that caused by adiabatic compression. This air enters the engine compressor. Compression of the air is done by a centrifugal blower operating at a ratio of, perhaps, 4 to 1 and the compressed air is fed into the flame tubes where combustion is consumated by the introduction of fuel as a continuous controlled flow. The addition of energy in the form of heat increases the specific volume of the combustion products which results in high flow velocity; and these gases drive the gas turbine wheel which is connected to the blower by a shaft and in turn drives the compressor. Thus, primary pressure energy is used but high exhaust gas velocity is still obtained. The exhaust gases are then allowed to leave the tail pipe in a rearward direction. The thrust, therefore, results from the change of momentum, the air being taken aboard at aircraft velocity and expelled at a much higher velocity. Thrust is controlled by varying the quantity of fuel burned. By varying the fuel pressure the amount of fuel injected through the nozzles will vary and change the r.p.m. of the unit, its mass flow, and therefore the jet thrust.

The oxygen of the atmosphere is depended upon to support combustion. Consequently, the altitude of the aircraft affects the thrust since the unit is, essentially, a turbine and it is known that because of the reduction of atmospheric density thrust decreases in the vicinity of 67,000 feet. The higher the aircraft climbs the greater the pressure differential across the usual engine driven fuel pump becomes, since a minimum pressure is required to introduce the fuel into the combustion chamber and the ambient pressure decreases whereby the pressure gradient increases. If the pressure differential increases beyond a critical design value then cavitation of the impeller vanes results and fuel flow to the engine drops off. In the actual aircraft this results in engine blow out or complete failure of combustion. Provision in the aircraft is made to overcome this difficulty by providing a booster pump for each engine, the booster pump being electrically driven, and when connected forms a hydraulic series connection with the main fuel pump whereby the pressure gradient is divided between the two pumps and the danger of cavitation is eliminated.

As will later be more fully pointed out, this invention provides a circuit to simulate to a trainee the condition of engine blow out caused by insufficient fuel flow to the engine and further provides a circuit to simulate the fuel flow booster pumps whereby if the trainee, during simulated flight, turns the booster pump control to the "on" position at the proper altitude the condition of engine failure by blow out will not occur.

It is accordingly a broad object of this invention to provide a circuit usable in an aircraft trainer to simulate to a trainee the condition of jet engine blow out caused by fuel pump cavitation at high altitudes.

It is a further object of this invention to provide in an aircraft trainer jet engine operation simulating circuit a differential relay responsive to conditions of simulated altitude and simulated fuel flow to operate a relay to thereby simulate the condition of jet engine failure.

It is another object of this invention to improve on the aircraft trainers now known.

The novel features of the invention are set forth with particularity in the appended claims and specification and the invention will be best understood from a consideration of the following description when read in connection with the accompanying drawings, hereby made a part of the specification, in which:

FIG. 1 is a schematic wiring diagram of the circuit embodying this invention, and FIG. 2 is a characteristic curve of an aircraft fuel pump output characteristic as measured against pressure differential across the pump.

Referring now to FIG. 1 of the drawings, reference character 10 indicates generally a potentiometer driven from a prior art altitude computer which is arranged to derive voltages representing the altitude of simulated flight. Reference character 12 indicates a potentiometer driven from a prior art fuel flow computer and arranged to derive voltages corresponding to the flow of fuel to the engine from the engine driven pumps. Reference character 14 indicates a differential relay having a rocking beam 16 pivoted at its center and contacts 18 and 21 arranged to be engaged thereby when it pivots to either of its extreme positions. Coils 20 and 22 are arranged adjacent to the rocking beam 16 and are connected by conductors 24 and 26 to the several respective altitude and fuel flow potentiometers. It will be readily seen that a voltage derived by the potentiometers will create a flux field in each coil which fields are directional in the same sense so that if the voltage, for example, of the fuel flow computer exceeds the voltage of the altitude computer magnetic force of coil 22 will prevail over the force from coil 20 causing an unbalance in forces on member 16 and thus making it pivot and close contact 18. In this example the fuel flow is relatively constant, changing only with large changes in loading such as take off and sharp climbing. The altitude computer in the usual way integrates the vertical component of the aircraft velocity and, in this case, drives the wiper arm downward for increasing altitude so that the voltage impressed on coil 20 diminishes with increasing altitude.

Conductor 28 leads to the armature 34 of a relay 30 having an energizing coil 32 connected in series with a manually operated switch 38 available to the trainee. Conductor 40 joins between the armature of relay 30 and energizing coil 42 of relay 44, having normally open contact 46 connected, as there shown, in the aircraft trainer's engine computer, which in the well known way computes the dynamic engine characteristics and causes action of instruments and meters within the view of the trainee to indicate to him that the engine is operating.

The curve of FIG. 2 shows a characteristic of an actual engine-driven fuel pump wherein the fuel pump flow is the ordinate and the pressure differential or pressure drop across the pump is the abscissa. The higher the pressure differential the lower the fuel flow output of the pump. As a direct result then of the aircraft climbing into high altitude, since the fuel pressure input to the engine combustion chamber is substantially constant, the pressure differential becomes greater with altitude and the pump output becomes less. This is the characteristic point that is simulated by potentiometers 10, 12 and differential relay 14. Obviously, there is a point on the characteristic curve of FIG. 2 wherein the pressure differential becomes so great that the fuel flow to the engine is insufficient to support combustion and the engine fails for lack of fuel. Differential relay 14 performs this function by weighing or measuring the voltages derived from computers 10 and 12 and when the simulated flight has reached an altitude as determined by computer 10 which would create too great a pressure differential across the fuel pump then the flux in coil 22 prevails rocking the member 16 clockwise and energizing coil 42 of relay 44 if contact 34 of relay 30 is closed.

In an actual aircraft, electrically driven booster pumps are provided which are turned by the pilot when he expects to reach an altitude which would cause cavitation and failure of fuel flow. Switch 38 is mounted in the trainee's compartmnt and is labeled "booster fuel pumps." It will be seen that if the pilot manually closes switch 38 then coil 32 is energized and contacts 34 is open. Thus, no matter what the altitude computer 10 and the fuel flow computer 12 may do in deriving voltages, still the action of the differential relay 14 will have no effect upon relay 44. Thus, the instructor can observe the trainee's procedure in closing switch 38 as he approaches the altitude wherein there is a possibility of engine failure by fuel flow.

In reviewing the operation of this circuit it should be pointed out that differential relay 14 has the single function of closing contact 18 when the voltages derived by computers 10 and 12 represent a critical value of pressure differential across the fuel pump during simulated flight. As previously described this is accomplished by the differential in magnetic force between arm 16 and coils 20 and 22. When this value is reached contact 18 is closed thereby applying ground to the energizing coil 42 of relay 44 if contact 34 is in the closed position as thereshown. This at once closes switch 46 and the engine computer responds to such closing by indicating to the trainee that the engine has failed. Obviously, other results flow from engine failure. The altitude computer will indicate to the trainee that altitude is decreasing, the velocity computer will indicate that the velocity has decreased, and the angle of attack will indicate that this too has changed because of the loss of thrust. The trainee's reaction to these conditions and his attempts to correct them are important, and thus an engine failure is accomplished without necessarily endangering an actual aircraft. Obviously, a second switch may be placed in series with switch 38 which can be opened by the instructor to simulate the condition of failure of booster pumps which condition will result in engine failure if the simulated aircraft goes beyond a critical altitude.

Having described a preferred embodiment of the present invention, it is to be understood that although specific terms and examples are employed, they are used in a generic and descriptive sense and not for the purposes of limitation; the scope of the invention being set forth in the following claims.

What is claimed is:

1. In an aircraft trainer of the type having analog computers with shafts movable to positions corresponding to functions of simulated altitude and simulated fuel flow and having aural and visual means to simulate to a student the operation of a jet engine, a circuit for simulating during training flight the condition of engine blow out caused by fuel pump cavitation at high altitude comprising in combination means connected to the respective altitude and fuel flow shafts to derive voltages proportional to their respective positions, a circuit including a relay responsive to the difference in magnitude between the respective voltages, a second circuit connected to the contact of said relay and to the engine operation means to disable the same in response to said relay to simulate engine blow out from insufficient fuel input thereto and manually controllable means in said second circuit to simulate the operation of a booster pump during simulated flight and comprising a relay having a contact in series with the contacts of said first recited relay to disconnect the same whereby the disabling of the engine operation means is made inoperative.

2. In an aircraft trainer of the type having analog computers with shafts movable to positions corresponding to functions of simulated altitude and simulated fuel flow and having aural and visual means to simulate to a trainee the operation of a jet engine, a circuit for simullating the condition of engine blow out caused by fuel pump cavitation at high altitude comprising in combination a pair of potentiometers each having its resistance winding connected to a source of electrical energy in mutually opposing senses and its respective wiper arm mechanically joined to a respective computer shaft to derive voltages proportional to altitude and fuel flow, a differential relay having its operating coils electrically connected to the wiper arms and operative to close a contact in response to a predetermined difference in magnitude between the derived voltages, a circuit connected to the relay contact and to the engine operating means to disable the same to reproduce to a trainee the condition of engine blow out from insufficient fuel input, means comprising a second relay in said circuit to simulate the operation of jet engine fuel booster pump during simulated flight and comprising a contact in series with the first recited contact to disconnect the same from the engine operation means whereby the said differential relay is inoperative to disable the engine operation means, and a circuit including a switch connected to the second relay for energizing the second relay to simulate the condition of turning on the booster pump.

References Cited in the file of this patent

UNITED STATES PATENTS

| | | |
|---|---|---|
| 903,193 | Jackson | Nov. 10, 1908 |
| 2,798,308 | Stern et al. | July 9, 1957 |
| 2,882,615 | Dawson | Apr. 21, 1959 |